United States Patent

[11] 3,604,109

[72] Inventor David J. Crimmins
Stockton, N.J.

[21] Appl. No. 877,347
[22] Filed Nov. 17, 1969
[45] Patented Sept. 14, 1971
[73] Assignee Thomas & Betts Corporation
Elizabeth, N.J.

[54] METHOD OF MAKING HORSESHOE-SHAPED KEEPERED WORD-LINE STRUCTURE FOR MEMORY PLANES
6 Claims, 7 Drawing Figs.

[52] U.S. Cl. .......... 29/604, 340/174 BC, 340/174 PW, 340/174 TF, 340/174 JA
[51] Int. Cl. .......... H01f 7/06
[50] Field of Search .......... 340/174 BC, 174 PW, 174 R, 174 TF, 174 JA; 29/604, 625

[56] References Cited

UNITED STATES PATENTS 3,333,333 8/1967 Noack .......... 29/604

OTHER REFERENCES

" Fabrication of Plated Stripline and Keeper," J. J. McNichol, IBM Technical Disclosure Bulletin, Feb., 1966, pp. 1278- 1279.

*Primary Examiner*—John F. Campbell
*Assistant Examiner*—Carl E. Hall
*Attorney*—Thomas M. Marshall

ABSTRACT: A keepered word-line structure for plated wire and thin film information storage matrices for memories having optimum magnetic field containment properties. Word-lines are formed on a base which has a significantly large amount by weight of a ferrite type material embedded into and covering both sides of a porous, reinforcing, dimensionally stable material, after which the word-lines are "flushed" with a ferrite mixture whereby each word-line is in intimate contact with, and surrounded on three sides by, the keeper material.

INVENTOR.
DAVID J. CRIMMINS
BY
Thomas M Marshall
ATTORNEY

METHOD OF MAKING HORSESHOE-SHAPED KEEPERED WORD-LINE STRUCTURE FOR MEMORY PLANES

In the art of making plated wire memories and thin film memories, it has been determined that some kind of material which concentrates and contains the magnetic field surrounding the word-lines produces an improved memory which generally requires less current to drive it. Ideally, the keeper material should totally surround and be in intimate contact with three sides of each word-line so that, in effect, a horseshoe-shaped keeper material surrounds the word-line.

The prior art method of obtaining a magnetic-field concentrating structure, or as commonly referred to in the art, a "-keepered structure" has been to utilize a commercial laminate of copper and a commercial laminate of ferrite material. The copper laminate which consists of a copper sheet laminated to a plastic-type substrate is etched in a fashion well known in the art to produce a series of word-lines. The etched copper laminate is then bonded to the ferrite laminate (which consists of plastic-type substrate coated with a ceramic-type magnetic material) with the plastic substrate being interposed between the word-lines and the ferrite material. The resulting structure is commonly referred to as a keepered word-line structure. However, since a layer of insulation is interposed between the keeper material and the word-lines, only one side of each word-line is "shielded" by keeper material. In other words, because of the intermediate insulation layer, the keeper does not extend between the lateral spacing between the word-lines. As a result, the keeper is only partially effective in concentrating the magnetic filed surrounding each word-line, and accordingly greater current is required to drive the memory plane.

Previous attempts to produce a horseshoe-shaped keeper surrounding the word-lines has resulted in difficult procedures which are very expensive, cumbersome and inefficient in that the optimum intimate relationship between the keeper material and the word-line has not been obtained.

Accordingly, it is the object of this invention to produce an optimum keepered word-line assembly for use as an element in the memory of a matrix type, which keepered assembly surrounds and is in intimate contact with three sides of the word-line.

It is a further object of this invention to provide a keepered word-line structure in which a ferrite material or other material which is electrically nonconductive, but which has the property of containing a magnetic field, is formed in such a manner as to be in intimate contact with and to surround the word-lines on three sides.

It is still a further object to provide a method for making a keepered word-line structure in which the keeper material surrounds and is in intimate contact with three sides of the word-line.

It is another object to provide a method for making a horseshoe-shaped keepered word-line structure, which method is simple, economical and highly efficient.

Briefly, this invention resides in a novel structure and the method for producing that novel structure. Specifically, the structure is a keepered word-line element of a plated wire memory or a thin film memory. In the specific embodiment described herein, a porous mat material such as a woven fiberglass cloth of the type normally used in preparing etched circuitry is first impregnated by a thoroughly mixed combination of an epoxy type of adhesive and a ferrite material. That mixture of ferrite and epoxy adhesive is worked very carefully into the fiberglass cloth so as to produce a wet glass mat which is not fully cured. A sheet of copper is placed in intimate contact with one side of the glass cloth, and this subassembly is then laminated to produce a unitary product in a laminating press following procedures which are well known in the art.

The results of these steps are to produce a laminate suitable for making a printed circuit board. The next step is to use a conventional etching technique for forming the word-lines on the base substrate made of the ferrite-adhesive glass cloth combination. Once this etching process has been completed, there is provided a word-line assembly which has ferrite intimately bonded to it on one side, and there is no layer of insulation between the copper word-lines and the keeper material. Furthermore, there are lateral spaces between adjacent word-lines.

As a separate step, a mixture of ferrite material and adhesive (e.g. epoxy) is worked into the lateral spaces between the word-lines so as to provide ferrite in intimate contact with the two lateral sides of each word-line, thus completing the horseshoe-shaped three sided keeper configuration in intimate contact with the copper. Once the keeper material is flush with the top or exposed side of the word-lines the epoxy-ferrite mixture is cured, thereby producing an optimum word-line construction.

Two of the horseshoe-shaped keepered word-line constructions may be assembled on opposite sides of a tunnel structure (for example, of the type disclosed in U.S. Pat. No. 3,465,432) to form a plated wire memory plane. Since each word-line is embedded in the horseshoe-shaped ferrite material configuration a much more efficient memory structure is produced in that, depending upon the amount of ferrite material employed, it is possible to concentrate and direct upwards of 90 percent of the magnetic field in the direction of the tunnel structure, thereby reducing the amount of current required to drive the memory.

These and other objects and advantages of the invention will become more apparent from the foregoing detailed description and appended claims taken in conjunction with the accompanying drawings in which:

BRIEF DESCRIPTION OF THE PREFERRED EMBODIMENT

Figures 1, 2:
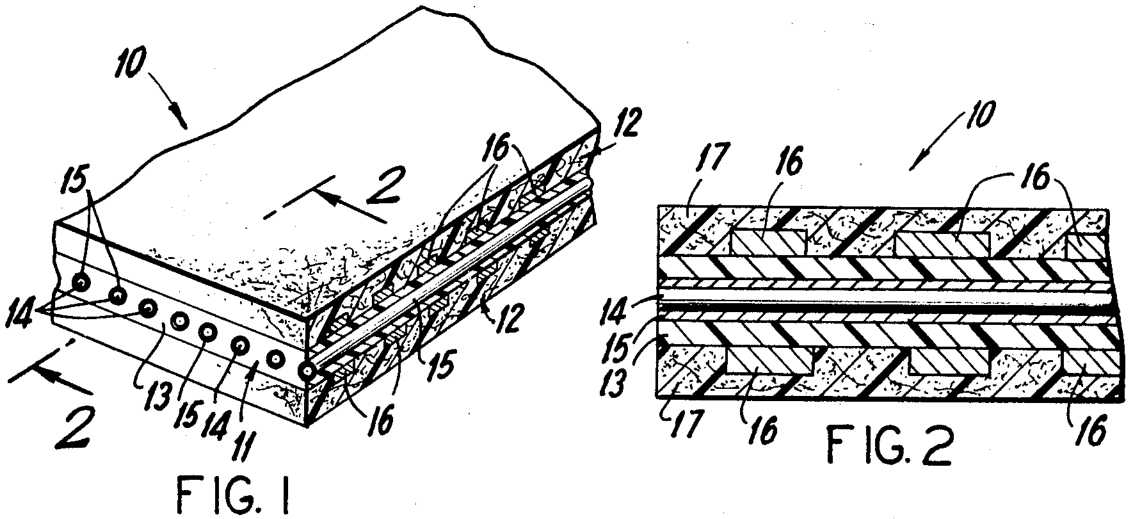
FIG. 1 is a perspective, partial view of a memory package utilizing the keepered word-line structure of this invention.
FIG. 2 is a cross section of the memory package illustrated in FIG. 1 taken along line 2—2.

FIG. 1 illustrates a memory package 10 comprising an intermediate tunnel structure 11 disposed between two of the keepered word-line structures 12, 12 of the invention. Each tunnel structure includes a dielectric base 13 containing a plurality of conductive wires 14, each coated with a thin film of a magnetic material 15 capable of existing at any given point in one or the other magnetic state.

Disposed on each side of the tunnel structure 11 is a keepered word-line structure 12 including electrical conductors or wires 16 commonly referred to as word-lines. As can be seen from the illustration of FIG. 2 which is a cross section of the memory package of FIG. 1, each word-line is surrounded on three sides, and is in intimate contact with, keeper material 17, with the "exposed" side of each word-line facing the adjacent magnetic wires 14, 15 which are generally disposed perpendicular to the word-lines. The keeper material 17 functions as a "flux concentrator," thereby reducing the amount of current required to be passed through the word-line in order to generate an output in the adjacent magnetic wire in order to change same from one state to its other state.

Figure 3:
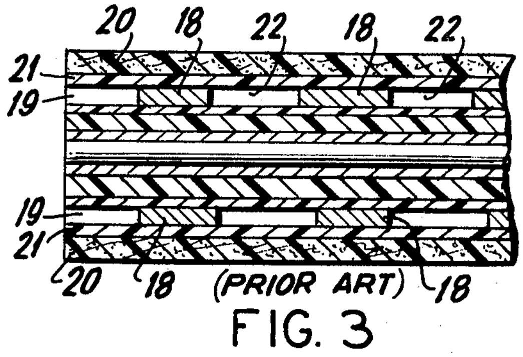
FIG. 3 is a cross section of a memory package of the prior art.

The contrast between the keepered word-line structure of the present invention and the prior art is made readily apparent to the observer by merely comparing the cross section illustrated in FIG. 2 with the cross section of a prior art keepered word-line structure as illustrated in FIG. 3. In the prior art assembly, each word-line 18 is embedded in a dielectric base material 19, and is separated from the keeper material 20 by a layer of insulation 21. Accordingly, the lateral spaces 22 between adjacent word-lines are filled with the dielectric material, and thus only one side of each word-line faces the keeper material. Hence, it is readily apparent that the effect of the keeper in the prior art devices is significantly less than the effect of the keeper in the keepered word-line structure of the present invention. It is noted that the present invention provides a keeper assembly that is both: (1) in intimate contact with the word-lines; and (2) surrounds each word-line on three sides in a horseshoe-shaped fashion thereby optimizing the "flux concentration" capability of the structure.

An initial step in the process is to prepare a mixture of a ferrite material and an adhesive, such as an epoxy resin. The ferrite material may be any of those materials which are nonconductive electrically, and yet have the ability to capture, contain and confine the magnetic field which surrounds a word-line on the passage of current through the word-line, so that the magnetic filed is concentrated and is not dissipated. The horseshoe-shaped configuration of the keepered material around the word-lines of the present invention is highly efficient in containing the magnetic field and confining it to the area of the crossovers between the word-line and the adjacent magnetic wires.

The amount of ferrite that is used in the mixture of the first step of the method may range from very small amounts which, of course, would have very little "flux concentrating" properties, up to that amount which is capable of being taken up by the adhesive and held without destroying the adhesive properties of the epoxy. For the first step of this process, preferably an amount equal to approximately 60 percent of weight of ferrite, based on the total weight of the mixture of ferrite and epoxy, be used.

The first step in the process is to saturate a porous mat, such as a fiberglass cloth mat, with the mixture of ferrite and epoxy. The saturation of the fiberglass cloth should be such that the ferrite/epoxy mixture is intimately contained within the open portions of the fiberglass cloth and in intimate contact with the individual fibers, so as to produce an even coating covering the weave on both sides of the cloth. The combination of the epoxy and the fiberglass cloth produces a dimensionally accurate printed circuit board substrate. This dimensionally stable characteristic is extremely important because of a critical requirement that the word-lines be initially accurately positioned, and that when subjected to wide ranges of temperatures and moistures, the relative positions of the word-lines to the magnetic wires in the memory package are not varied. The significance of this characteristic is also realized when it is considered that in the various processes of preparing the word-line structure, particularly during the lamination steps and the curing steps, heat will be involved and without a dimensionally or accurate substrate, the word-lines made might tend to "swim" or tend to be displaced, thus comprising the accuracy which is required in order to produce the high density characteristics of the plated wire or thin film memory.

Figure 4:
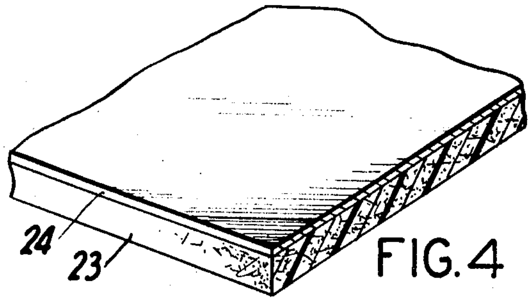
FIG. 4 is illustrative of the first step of the process for producing the keepered word-line structure of the present invention.

Referring to FIG. 4, once the wet fiberglass cloth 23 (saturated with the ferrite/epoxy mixture) has been formed the next step in the process is to bond a thin sheet of copper 24 on one side of the wet fiberglass mat. The subcombination of copper and wet fiberglass cloth may be subjected to a laminating press in order to adhere the copper sheet to the wet fiberglass cloth. During this lamination step, the epoxy is cured either partially or entirely depending upon the method which it is desired to use for "flushing" the word-line circuitry in the steps which are described below.

It is noted that the resulting assembly illustrated in FIG. 4 may be drilled through in order to produce plated-through holes for connection of the respective word-lines to a bus bar assembly or the like.

Figures 5, 6, 7:
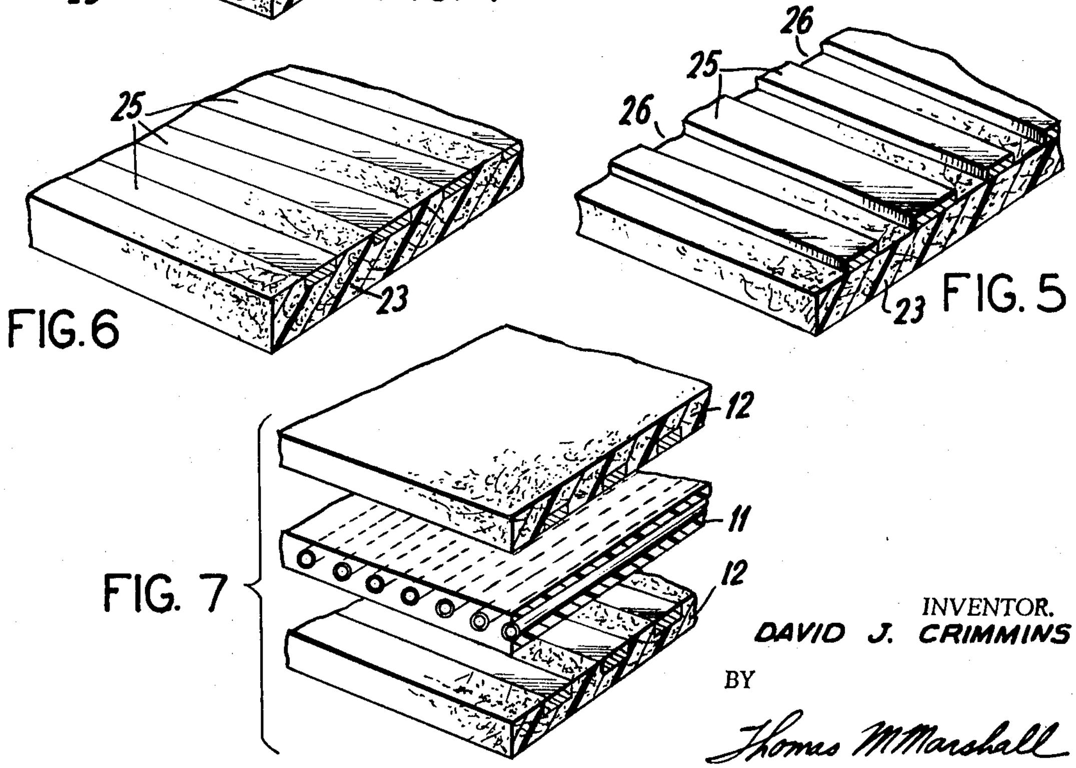
FIG. 5 is illustrative of the second step of the process for producing the keepered word-line structure of the present invention.
FIG. 6 is the last step of the process for producing the keepered word-line structure of the present invention.
FIG. 7 is an exploded perspective view of a memory package made by laminating two keepered word-line structures of the present invention and a tunnel structure.

Turning to FIG. 5 the next step in the process is to etch the copper sheet 24 using conventional etching techniques in order to produce a series of word-lines, designated by numeral 25.

The next step in the process is to fill the lateral spaces 26 (see FIG. 5) disposed between adjacent word-lines with another mixture of ferrite-type material and epoxy until the resulting assembly is flush with the exposed side of the conductors, thereby completing the horseshoe-shaped configuration of the keeper material. The resulting structure is illustrated in FIG. 6. The ratio of ferrite to epoxy in this second mixture may be the same as used in the initial step. However, in certain instances, inasmuch as the second mixture is being bonded to another ferrite/epoxy mixture in all areas except along the vertical side edges of the copper word-lines, it is possible to use a very high content of ferrite, and in certain instances the preferred range is between 60 and 90 percent by weight of ferrite to epoxy, for this second mixture. The simplest flushing operation is to apply the second mixture of ferrite/epoxy to the wet fiberglass cloth surface on which the word lines are formed, followed by the use of a squeegy or doctor blade to scrape off the excess and expose the upper surfaces of the copper word-lines. Following the flushing of the circuits of the word-lines, the ferrite/epoxy mixture is allowed to cure or may be subjected to additional heat in order to speed the curing of the epoxy.

An alternative method of flushing the copper conductors would be to only partially cure the ferrite/epoxy fiberglass cloth structure, and after the word-lines have been formed by etching, forcing the word-lines down into the partially cured ferrite/epoxy fiberglass material by the use of heat and pressure during a lamination process.

Turning to FIG. 7 there is illustrated an exploded view of the three major subassemblies of the plated wire memory which is illustrated in FIG. 1. The upper and lower keepered word-line structures 12, 12 are similar to those made according to the steps illustrated in FIGS. 4–6, and include word-lines which are surrounded on three sides by, and in intimate contact with, a horseshoe-shaped keeper structure, and a tunnel structure 11 having its magnetic wires disposed orthoganally with respect to the word-lines of the upper and lower keepered word-line structure.

Following assembly of the components illustrated in FIG. 7 it may be necessary to provide interconnections between the word-lines of the upper and lower keepered word-line structures, and for this purpose, as previously mentioned, the ferrite/epoxy fiberglass cloth assembly is particularly suited in that it may be drilled through for the purposes of providing a plated-through-holes for interconnecting the various assemblies.

If desired, the step indicated and illustrated in FIG. 4 may be modified by laminating a copper sheet to both the upper and lower sides of the ferrite/epoxy fiberglass mat, with one copper sheet being etched to define the copper word-lines, while the other sheet is etched to provide the bus bar assembly and the like.

In describing the steps above, various percentages of ferrite have been given. Theoretically, a maximum percentage of ferrite will afford maximum "flux concentration" of the keepered word-line structure. However, in using a standard commercial porous mat, such as woven fiberglass cloth that is available for making printed circuits, I have found that, with a proper apparatus for saturating the mixture into the mat, as much as 90 percent by weight of ferrite can be forced into the weave. However, at this point and above, the bond created by the curing of the epoxy begins to deteriorate. Thus, although it would be possible to make the commercial product containing 90 percent of ferrite as the first step in the process, the cost would be considerably more for labor as against a ferrite/epoxy mixture which contains approximately 60 percent ferrite by weight and is much easier to work. Accordingly, the preferred range given above is not intended to be confining, except in the sense that it is my belief that between 30 and 60 percent ferrite by weight will produce a product which will combine the advantages of this invention and yet will be capable of being produced at an expensive rate, while providing an efficient keeper assembly having dimensional stability.

With reference to the flushing step, since the ferrite/epoxy mixture for this step is not required to be bonded to the porous mat, but instead is bonded to the ferrite/epoxy mixture which is saturated into and on the fiberglass cloth, at this stage it is possible to include up to 90 percent of ferrite by weight, since there is less criticality involved. The epoxy in the lower percentage will bond well to itself, and I have found in experimentation that the bond which is produced between the structure as shown in FIG. 5, after it has been etched, and the ferrite/epoxy flushing material, is such that there is a zero bond line, or, in other words, a substantially homogeneous product results. On the broad side of the word-line, the ferrite in contact with it may be as low as 30 percent or even lower if that is all that is required. However, in the lateral spaces 26 between the word-lines, the higher percentage of ferrite used in the flushing mixture results in a high percentage of ferrite being in intimate contact with the vertical side surfaces of the word-lines, and thus produces the horseshoe-shaped keeper material around the word-line on three sides for improved "flux concentration" purposes.

In selecting the porous mat, I would optimize the thickness of the total structure as illustrated in FIG. 4 in order to contain upwards of 90 percent of the magnetic field surrounding the word-line upon the passage of current therethrough.

Described hereinabove, is a new and useful three-sided keeper structure for word-lines used in a memory plane, and the method of making same. The structure and the method employ basic raw materials, instead of using commercially available laminates as heretofore known in the art, with the result being a unique laminate which is glass epoxy reinforced board having a keeper material bonded to electrolite copper or other etchable copper in order to produce word lines, and, if desired, on the opposite side thereof the turn-arounds (for connecting the word-lines on opposite sides of the tunnel structure) or bussing units and the like.

While the above-described examples are descriptive of specific glass cloth reinforcing materials and epoxy resins and the standard types of ferrites, and while the illustrations are in the form of preparing a plated wire type of memory, it will be appreciated that the same principles are involved in producing a thin film memory having a keepered word-line structure as described above.

It should also be understood of course that the foregoing disclosure relates only to the preferred embodiments of my invention. This disclosure is intended to cover all changes and modifications to the example of this invention which do not constitute departures from the spirit and scope of the invention which is set forth in the appended claims.

I claim:

1. A method of making a keepered word-line structure comprising the steps of:

impregnating a porous mat with a mixture of an adhesive and magnetic-field-containing, nonelectrically conductive material;

bonding a sheet of electrically conductive material to the impregnated porous mat;

forming a plurality of word-lines by removing portions of the sheet of electrically conductive material, said word-lines being spaced laterally from each other;

filling the lateral spaces between adjacent word-lines with a mixture of an adhesive and magnetic-field-containing, nonelectrically conductive material; and curing the adhesive to form a dimensionally stable structure.

2. A method of making a keepered word-line structure comprising the steps of:

impregnating a porous mat with a mixture of an adhesive and magnetic-field-containing, nonelectrically conductive material;

bonding a sheet of electrically conductive material to each opposite side of the impregnated porous mat;

forming electrical circuits by removing portions of each sheet of electrically conductive material, said circuits consisting of electrical conductors spaced laterally from each other;

filling the lateral spaces between the electrically conductive elements in the electrical circuitry formed on the opposite side of said impregnated porous mat with a mixture of an adhesive and magnetic-field-containing, nonelectrically conductive material; and curing the adhesive form a dimensionally stable structure.

3. The method of making a memory of the matrix type comprising the steps of:

preparing a tunnel structure element containing a plurality o spaced parallel magnetic wires carried in a support structure;

preparing a mixture of an adhesive material and a ferrite material wherein the ferrite material is from 10 to 95 percent by weight of the mixture;

impregnating a porous mat material with the mixture prepared by the proceeding step in such a way as to completely fill the pores of said mat material;

placing on the opposite faces of said porous material electrically conductive material suitable for forming electrical circuitry;

subjecting the electrically conductive material, the mat, and the adhesive and ferrite mixture to heat and pressure to form a laminate and to at least partially cure the adhesive material;

subjecting the assembly prepared by the preceding steps to an etching process to produce electrical circuitry including word-lines;

subjecting the etched laminate of the preceding step to an application of a mixture of adhesive and ferrite material so that the surface of the mixture is flush with the top of the word-lines;

curing the adhesive and ferrite material mixture applied in the preceding step; and assembling the keepered word-line structure subassembly with the tunnel structure described in the first step to produce an element of a plated wire memory.

4. The method of making a keepered word-line structure element for a memory of the matrix type which comprises the steps of:

impregnating an open weave fiberglass cloth material with a mixture consisting of an adhesive of from 30 to 90 percent by weight of a ferrite material to form a wet mat;

placing a sheet of copper foil on one surface of the wet mat;

subjecting the subassembly produced by the preceding step to heat and pressure to at last partially cure the adhesive and to produce a laminate consisting of the wet mat and the copper foil;

subjecting the sheet of copper foil of the laminate produced by the preceding step to an etching process to produce word-lines, said word-lines being spaced laterally from each other;

applying a mixture of adhesive and from 30 to 90 percent by weight of a ferrite material in such manner as to produce a substantially flat surface consisting of the outer surface of the word-lines and said mixture so that the ferrite material is in intimate contact with the sides of the word-lines but does not extend above them; and curing the ferrite adhesive mixture applied in the preceding step so as to produce a keepered word-line structure having keepered material in intimate contact with, and on three sides of, the word-lines.

5. A method of making a keepered word-line structure comprising the steps of:

impregnating a porous mat with a mixture of an adhesive and magnetic-field-containing, nonelectrically conductive material;

bonding a sheet of electrically conductive material to the impregnated porous mat;

forming a plurality of word-lines by removing portions of the sheet of electrically conductive material, said word-lines being spaced laterally from each other;

subjecting the structure of the preceding step to pressure sufficient to cause the word-lines to be partially embedded in the impregnated porous mat; and curing the adhesive.

6. The method of making a horseshoe-shaped, keepered word-line structure for use in a memory of the matrix type which comprises the steps of:

preparing a wet layup of a fiberglass cloth material impregnated with a mixture which consists of a ferrite material and an adhesive;

placing a sheet of electrically conductive material on one side of said wet layup;

subjecting the assembly of the preceding step to heat and pressure in a laminating press to produce a partially cured laminate;

subjecting the laminate to an etching process to produce word-lines from said electrically conductive sheet, said word-lines being spaced laterally from each other;

subjecting the etched laminate produced by the preceding steps to pressure sufficient to cause the word-lines to be partially embedded in the partially cured ferrite/adhesive mixture; and curing the assembly resulting from the previous steps.